(12) United States Patent
Feuerherm

(10) Patent No.: US 7,448,864 B2
(45) Date of Patent: Nov. 11, 2008

(54) EXTRUDER HEAD

(76) Inventor: Harald Feuerherm, Im Laach 33, 53840 Troisdorf (DE)

( * ) Notice: Subject to any disclaimer, the term of this patent is extended or adjusted under 35 U.S.C. 154(b) by 169 days.

(21) Appl. No.: 11/082,782

(22) Filed: Mar. 17, 2005

(65) Prior Publication Data

US 2005/0218247 A1    Oct. 6, 2005

Related U.S. Application Data

(62) Division of application No. 09/611,764, filed on Jul. 7, 2000, now Pat. No. 6,953,333.

(30) Foreign Application Priority Data

Jul. 9, 1999    (DE) .............................. 199 31 870

(51) Int. Cl.
*B29C 47/22* (2006.01)

(52) U.S. Cl. .................... 425/381; 425/382.4; 425/465; 425/466; 425/532

(58) Field of Classification Search ................ 425/308, 425/381, 382.4, 465, 466, 532, 380; 264/541
See application file for complete search history.

(56) References Cited

U.S. PATENT DOCUMENTS

| | | | |
|---|---|---|---|
| 4,279,857 A * | 7/1981 | Feuerherm | 425/381 |
| 4,382,766 A * | 5/1983 | Feuerherm | 425/465 |
| 6,024,557 A | 2/2000 | Feuerherm | 425/532 |
| 6,284,169 B1 * | 9/2001 | Feuerherm et al. | 425/465 |
| 6,354,828 B1 | 3/2002 | Feuerherm et al. | 425/532 |
| 6,953,333 B1 * | 10/2005 | Feuerherm et al. | 425/381 |
| 7,267,541 B2 * | 9/2007 | Feuerherm | 425/381 |

FOREIGN PATENT DOCUMENTS

DE    28 23 999    5/1979
EP    0885711 A1    12/1998

* cited by examiner

*Primary Examiner*—Robert B. Davis
*Assistant Examiner*—Joseph Leyson
(74) *Attorney, Agent, or Firm*—Collard & Roe, P.C.

(57) ABSTRACT

An extruder head for extrusion blow-molding plastic containers includes a ring gap nozzle with a mandrel and a ring-shaped nozzle body. An elastically deformable sleeve is arranged on an end of the nozzle outlet side and defines a gap width which can be varied by axial setting movements of the mandrel and/or the nozzle body. The geometry of the nozzle gap can be influenced by radially deforming the sleeve with setting devices during the extrusion of a hose-shaped preformed blank. The sleeve may be moved in a radial direction and is guided on sliding surfaces which support it in upward and downward directions. The sleeve may be in the form of a cylinder or tube. A lower edge of the sleeve shapes a cross-section of a melt stream exiting from the ring gap nozzle.

13 Claims, 14 Drawing Sheets

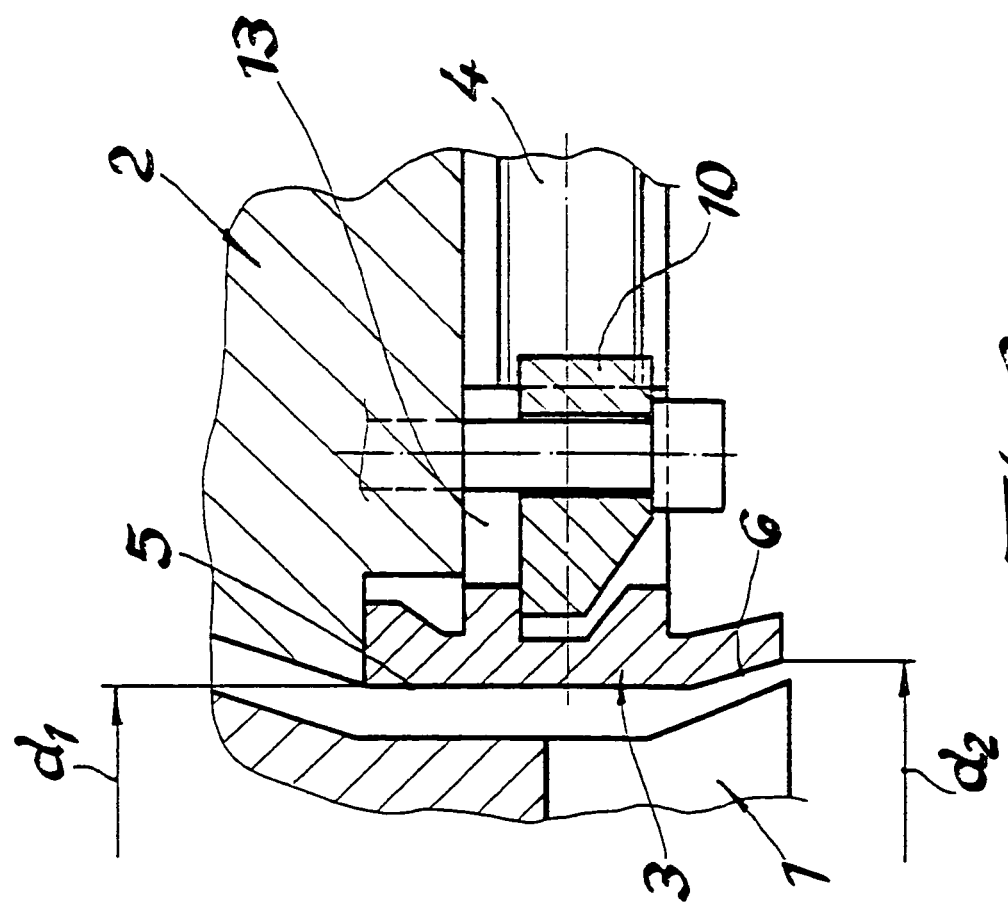
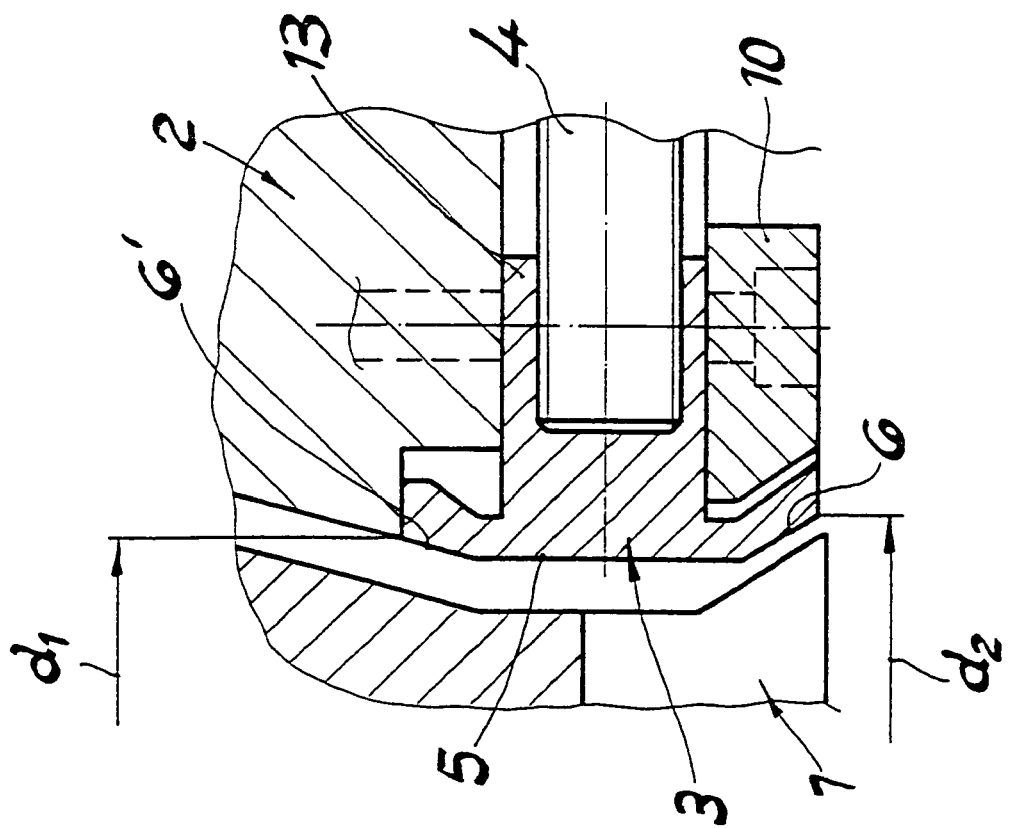

EXTRUDER HEAD

CROSS REFERENCE TO RELATED APPLICATIONS

This application is a divisional of application Ser. No. 09/611,764, filed on Jul. 7, 2000, now U.S. Pat. No. 6,953,333, which claimed priority under 35 U.S.C. §119 of German Application No. 199 31 870.0 filed on Jul. 9, 1999.

BACKGROUND OF THE INVENTION

1. Field of Invention

The invention relates to an extruder head for extrusion blow-molding plastic containers, comprising
 a ring-gap nozzle having a mandrel and a ring-shaped nozzle body;
 an elastically deformable sleeve; and
 setting devices for deforming the elastic sleeve radially. whereby the sleeve arranged on the outlet side of the nozzle defines a nozzle gap whose width is variable by axial setting movements of the mandrel and/or body of the nozzle, and whose geometry can be influenced by deforming the sleeve in the course of extrusion of a hose-like preformed blank; and whereby the sleeve is guided with radial mobility on sliding surfaces that support the sleeve upwards and downwards.

2. Prior Art

An extrusion head with the features described above is known from DE-A 28 23 999 (FIG. 7). The sleeve, which is arranged in the body of the nozzle, has a symmetrical profile and a cylindrical center section as well as identical conical widenings at both ends of the sleeve. The upper and lower faces of the elastically deformable sleeve are guided on the body of the nozzle. The setting devices for deforming the sleeve radially are arranged in the plane of symmetry.

The pressure of the melt in the conical inlet zone of the sleeve amounts to multiple times the pressure of the melt prevailing in the conical outlet of the sleeve. The consequence thereof is that an axial force directed from the top down is applied to the sleeve. Said axial force is introduced into the body of the nozzle via the support on the underside. In addition, as the melt is flowing through the gap of the nozzle, a force directed downwards as well is acting on the sleeve because of the resistance to flow. Said force is dependent upon the through-put, the width of the annular gap, the viscosity, the temperature, as well as other factors. On its lower face side, the sleeve rests on the sliding surface of the nozzle body with only a narrow annular surface because any enlargement of the wall thickness of the sleeve is limited in that the latter is required to be deformable, on the one hand, and, furthermore, because the sleeve has to project radially inwards on the ring holding the body of the nozzle, on the other hand. Such inward projection is necessary in order to prevent the melt from running up on peripheral sections of the holding ring as it exits from the gap of the nozzle, said holding ring being a component of the nozzle. These constraints lead to the fact that the lower face side of the sleeve, which is supported on the body of the nozzle, is subjected to high molding pressure, and, furthermore, may be subjected to considerable wear during the radial movements occurring in conjunction with the deformation of the sleeve. Such wear is high because the sleeve is continuously subjected to radial movements due to the program-controlled motions of the setting devices occurring in the course of extrusion of the hose-shaped preformed blanks.

SUMMARY OF THE INVENTION

The invention is based on the problem of further developing an extruder head with the features specified above, in a way such that largely wear-free deformations and displacements are possible at the end of the sleeve on the hose outlet side.

The problem is solved according to a first embodiment of the instruction as defined by the invention in that the sleeve is realized from the upper end on the inlet side to the outlet of the nozzle in the form of a cylinder or tube with a longitudinal profile arranged on the cylinder, whereby the cross-section of the stream of melt exiting from the annular gap of the nozzle is shaped by the lower edge of the sleeve located on the inner side of the tube, as said stream of melt is exiting from the annular gap of the nozzle. The sleeve can be designed in the form of a tube with a cone that is slightly directed inwards or outwards, The conical angle amounts to only a few degrees in this connection. A longitudinal profile is present to this extent that is approximated to the shape of the cylinder.

The sleeve cooperates with a conical part of the nozzle with the annular gap, whereby the conical surface is formed on the mandrel or on the body of the nozzle depending on how the elastically deformable sleeve is arranged. When the sleeve is deformed by the radially engaging setting devices, the cylindrical or at least approximately cylindrical structural shape of the sleeve assures that the upper face of the sleeve maintains its plane parallelism in relation to the sliding surface. No distortions occur within the sleeve that could cause leaks between the sleeve and the corresponding sliding surfaces of the nozzle body. Owing to its cylindrical or at least approximately cylindrical shape, the sleeve is subjected only to minor axial forces that originate from the resistance to flow of the stream of melt flowing by. The compensation of forces as desired according to the invention is realized in an ideal manner.

An extruder head with a substantially cylindrical, elastically deformable sleeve for influencing the geometry of the melt channel is known per se from DE-A 28 23 999 (FIG. 3). A ring is present on the top side of the sleeve and is centered only by radial set screws. The molding pressure prevailing in the melt channel is axially transmitted to the sleeve, so that the technical problem explained above arises in connection with the present design as well. Furthermore, within the framework of the known measures, the cylindrical sleeve is always arranged within the ring gap nozzle with spacing from the outlet of the nozzle. Any profiling of the stream of melt implemented within the ring-gap nozzle is degraded again along the further path of the stream of melt. A cylindrical, elastically deformable sleeve within the interior of the extruder head is therefore employed only for pre-profiling the stream of melt. The deformation of the sleeve used for such pre-profiling is set fixed by means of set screws and is not subjected to any changes as a preformed blank is being extruded. The prior art does not provide any suggestions to the extent that a cylindrical or at least approximately cylindrical sleeve be employed on the orifice of the nozzle that is continuously subjected to constantly changing deformations by preferably program-controlled setting devices as the hose being molded is exiting, and whose lower edge shapes the cross-section of the stream of melt as the latter is exiting from the ring-gap nozzle.

With the arrangement as defined by the invention and described above, the exiting stream of melt is subjected to considerable shearing stress acting on the lower edge of the elastically deformable sleeve. Such shearing stress may cause inhomogeneities in the stream of melt which, with certain plastic materials and with extreme nozzle gap geometries, may cause quality reductions in the blow-molded hollow body. For the purpose of improving the smoothing effect and for achieving superior blow-molding results, the lower edge of the sleeve can be rounded off, or it may have a profiled edge shaping the exiting stream of melt, such a profiled edge preferably having the shape of a conical chamfered surface. Other embodiments of the cylindrical sleeve are also disclosed.

If the blow-molded plastic containers have to satisfy very high quality requirements, preferably an elastically deformable sleeve is used that is adapted to the course of the melt channel toward the end of the nozzle outlet side by a conical profile. The sleeve is preferably arranged in the body of the nozzle. An extruder head for extrusion blow-molding plastic containers having these features is an object of the invention as well.

The elastically deformable sleeve is no longer designed in a symmetrical way. The invention is based on the idea that a conical widening of the sleeve on the side of the nozzle outlet can be used in order to at least partly compensate axial forces acting on the sleeve due to the pressure development in the melt channel as well as the flow resistance, or to even effect a reversal of such axial forces. The compensation of such forces is accomplished in that the inside diameter of the sleeve on the upper face of the sleeve is selected smaller than the one in the outlet of the nozzle. The resulting compensating force originates from the projected annular surface that is determined by the inside diameter of the sleeve at the nozzle outlet, and the inside diameter of the sleeve at the nozzle inlet, multiplied by the pressure prevailing in the gap of the nozzle at the end on the nozzle outlet side.

The inlet zone of the sleeve can be designed in the form of a cylinder or tube with a longitudinal profile adapted to the shape of the cylinder. According to another embodiment of the instruction as defined by the invention, provision is made that the sleeve has conical widenings at both ends, whereby the conical widening on the outlet of the nozzle is greater than the widening at the upper end on the inlet side. In order to fix the inside diameter of the sleeve at the upper end on the inlet side as well as the inside diameter of the sleeve at the outlet of the nozzle, the rule of coordination of said two diameters to be strived for is that the axial force exerted by the pressure of the melt on the sleeve in the downward direction will be largely compensated, but at least compensated by 50% by the lower pressure of the melt prevailing in the outlet of the nozzle, said lower pressure exerting an upwardly directed force on the sleeve. The sleeve usefully has a cylindrical center section located between the two conical widenings.

The compensation of the axial forces described above for compensating the axial forces exerted on the sleeve by the stream of the melt is possible also in an analogous manner if the sleeve is arranged on the mandrel. Such an embodiment is another object of the invention.

An unsymmetrical design of the sleeve poses the risk that distortions may occur in the sleeve as it is being radially deformed. Distortions are understood to be wave-like elevations and deepenings on the top or lower edge of the sleeve. Such distortions cause disturbing leaky spots between the sleeve and the corresponding sliding surfaces of the nozzle body or mandrel. The instruction as defined by the invention is based on the finding that such distortions can be avoided or at least reduced to a measure that no longer has any interfering effect if the measures specified herein are realized in combination. With an unsymmetrical design of the sleeve, the points of force application by the setting devices are preferably located according to the instruction of the invention not at the level of half of the height of the sleeve, i.e., they are located out of center in the longitudinal direction of the sleeve. The suitable cross-sectional plane for the points of force application can be determined with the help of orienting tests. The cross-sectional plane for the points of force application by the setting devices is usefully fixed within the framework of the instruction of the invention in such a way that in the presence of maximum deformation of the sleeve, distortions of maximally 60 µm, preferably 30 µm at the most occur on the upper face of the sleeve in the axial direction.

If the points of force application by the setting devices are fixed at the level of half of the height of the sleeve in connection with an unsymmetrical embodiment of the sleeve, it is necessary to implement appropriate measures in order to avoid distortions on the face side. In this case, the sleeve is provided with a collar on the outer side, which is designed in such a way that when the sleeve is deformed, the upper face of the sleeve guided on a sliding surface of the nozzle body will at least approximately maintain its plane parallelism in relation to the sliding surface. The collar is preferably located at one end of the sleeve and forms the sliding surface. With the help of orienting tests it is possible to fix the design of the collar provided at one end, or of the collars provided at both ends, said two collars, however, being designed in different ways, in a way such that in the presence of maximum distortion of the nozzle, distortions of maximally 60 µm, preferably 30 µm at the most will occur on the upper face of the sleeve in the axial direction.

Mathematical methods for coordinating the points of force application or for realizing the sleeve are also described. Distortions on the upper face of the sleeve can be avoided if the sleeve has a collar serving as a sliding surface at least at one end, said collar being designed in such a way that the moment of area deviation determined for the wall profile of the sleeve is approximately zero in the center of gravity of the area, and that with such a design, the points of force application by the setting devices are arranged in the cross-sectional plane in which the area point of gravity is located. Wall profile means the profile of the sleeve viewed in a longitudinal section. The area center of gravity in a YZ-system of coordinates has the following coordinates:

$$y_s = \frac{1}{A} \int_A y \, dA$$

$$z_s = \frac{1}{A} \int_A z \, dA$$

The moment of area deviation $$I_{yz} = -\int_A yz \, dA$$

is a moment of area of the second order and a quantity of area geometry as well; its value is dependent on the shape of the area and its position in the system of coordinates. It has been found, furthermore, that disturbing distortions on the face of the sleeve can be avoided if, with a wall profile of the sleeve whose moment of area deviation determined in the center of gravity of the area substantially deviates from zero, the points of application of force by the setting device are arranged offset versus the cross-sectional plane in which the center of gravity of the area is disposed. In practical life, the point of application is shifted in the direction of the end of the sleeve that has the smaller inside diameter. It is possible in this way to compensate the effect of a moment of area deviation.

The setting devices acting on the elastically deformable sleeve are generally arranged in a horizontal plane. It lies within the scope of the invention as well that the setting devices are connected to the sleeve below a line of action of force that is directed inclined upwards. With a line of action that is directed inclined upwards, an additional compensating force acts on the sleeve that is directed against the downwardly directed force exerted on the sleeve by the melt.

Different constructional possibilities are available in connection with all embodiments of the invention described above for supporting the elastically deformable sleeve on the underside. Said possibilities are also described.

It is possible with the measures described above to at least partly compensate the axial forces acting on the elastically deformable sleeve in order to reduce in this way the wear caused by the radial movements of the sleeve on the sliding surface supporting the sleeve on the underside, or to even reverse the direction of the forces and to thereby prevent wear from occurring on the lower face. If the described compensation measures do not suffice, provision can be made on the side of the jacket of the sleeve facing away from the melt channel for additional or individual measures for compensating the force. According to an embodiment as defined by the invention, provision is made that the sleeve is supported in the axial direction on springs that compensate an axial force exerted on the sleeve by the pressure of the melt, whereby the upwardly directed force of the initially tensioned springs also can be greater than the downwardly directed force exerted on the sleeve by the stream of the melt. Instead of using springs it is possible also to employ other elements exerting force with comparable effects. According to another embodiment, a pressurized fluid is acting on the sleeve on the jacket side facing away from the melt channel, said fluid compensating an axial force exerted on the sleeve by the pressure in the melt channel. Such a fluid may be a separate blocking medium or also a part stream of the plastic melt, which is branched off from the melt channel and passed by the outer side of the sleeve jacket in a suitable manner.

BRIEF DESCRIPTION OF THE DRAWINGS

The invention is explained in the following with the help of the drawing showing only one exemplified embodiment of the invention. In the drawing.

FIGS. 5 to 15 show further embodiments of the device as defined by the invention.

DETAILED DESCRIPTION OF THE INVENTION

Figure 1:
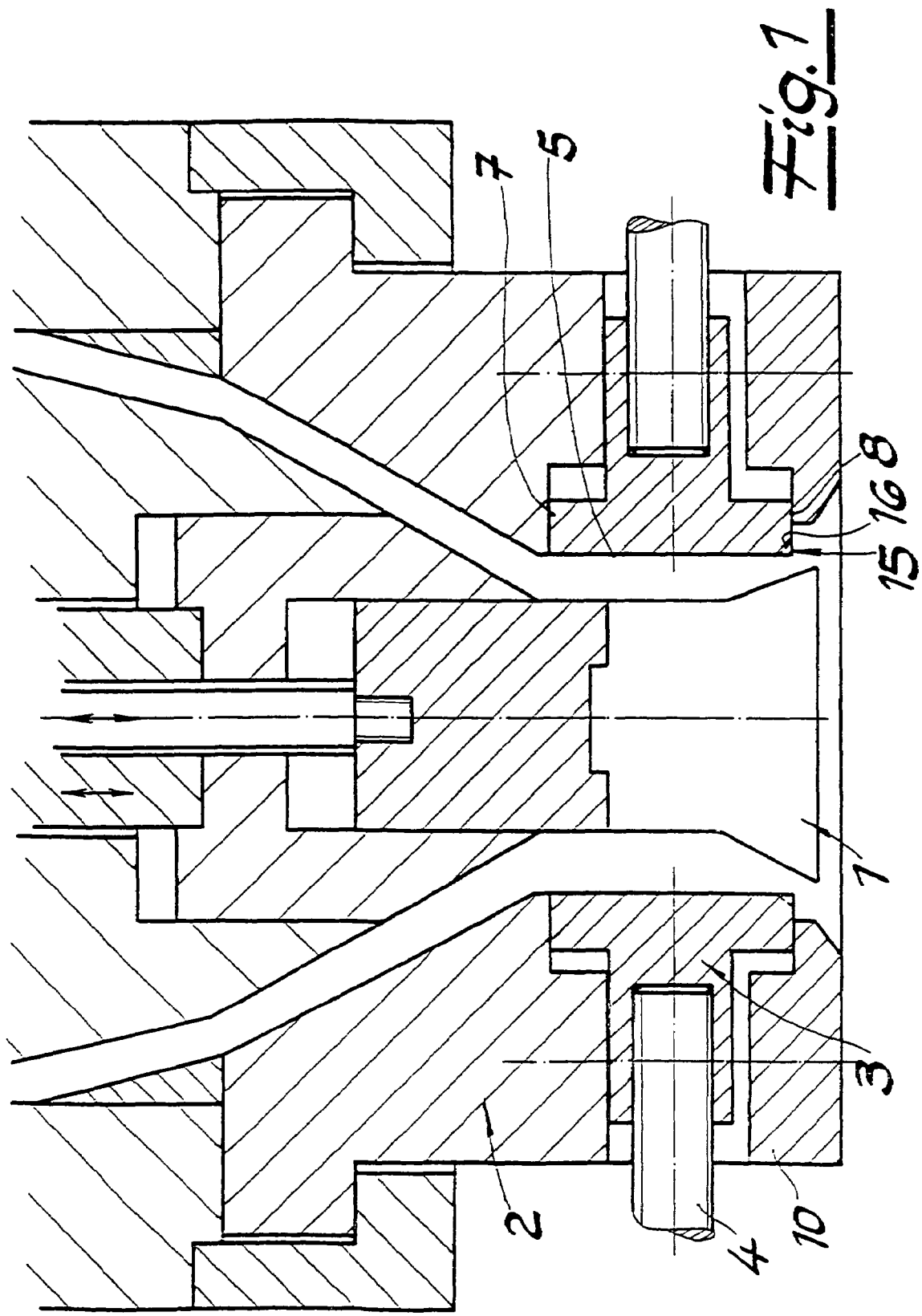
FIG. 1 shows a longitudinal section through a ring gap nozzle of an extruder head.

The devices shown in the figures are employed for extrusion blow-molding plastic containers. In such a process, a hose-shaped preformed blank is extruded from a thermoplastic melt through an extruder head and then expanded in a blow mold (which is not shown) to produce a plastic container. The extruder head has an annular gap nozzle with a mandrel 1, a ring-shaped nozzle body 2, as well as an elastically deformable sleeve 3. The sleeve 3 is guided with radial mobility on the sliding surfaces 7, 8 of the nozzle body 2 or the mandrel 1, said sliding surfaces supporting the sleeve 3 at the top and bottom. The setting devices 4 are associated with said sleeve and through the setting movements of said setting devices, the sleeve is radially deformable and also radially displaceable. The sleeve 3 delimits a nozzle gap whose width is variable by axial setting movements of the mandrel 1 and/or the nozzle body 2, and whose geometry can be influenced by deforming the sleeve 3 while a hose-like preformed blank is being extruded. The axial setting movements of the mandrel 1 and/or the nozzle body 2 as well as the radial setting movements acting on the sleeve 3 are program-controlled.

In the exemplified embodiment shown in FIG. 1, the sleeve 3 is arranged in the body 2 of the nozzle. From the upper end on the inlet side to the exit of the nozzle, said sleeve is realized in the form of a cylinder or tube with a longitudinal profile approximated to the shape of the cylinder, and arranged in such a way that the cross-section of the stream of melt exiting from the ring gap nozzle is shaped in the outlet of the nozzle by the lower edge 15 of the sleeve 3 located on the inner side of the tube. For the purpose of enhanced smoothing of the stream of melt, the lower edge 15 of the sleeve 5 can be rounded off or have a profiled edge shaping the stream of melt. In the present exemplified embodiment, the profiled edge is realized in the form of a conical chamfered surface 16.

Figure 10A:
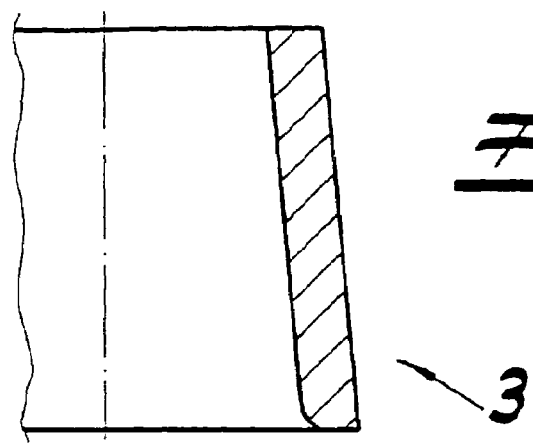
Figure 10B:
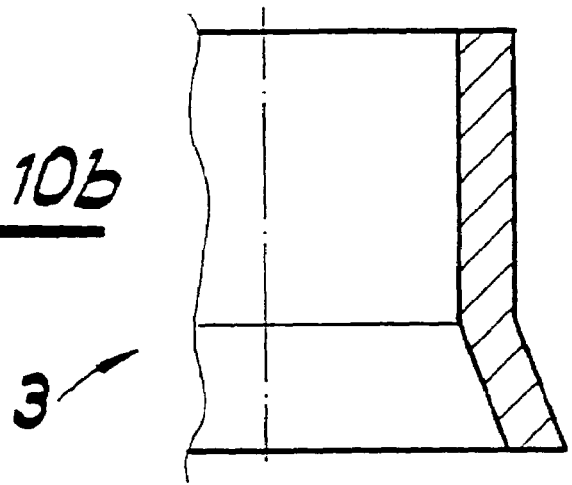
Figure 10C:
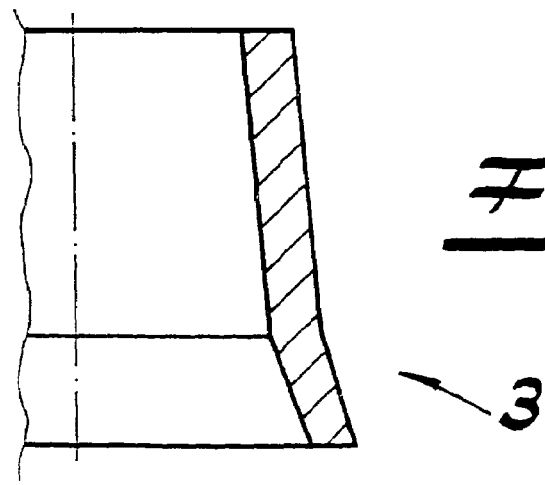

In FIG. 1, the elastically deformable sleeve is designed in the form of a cylinder having an inner surface of constant diameter, which jointly with the conical surface of the mandrel 1 forms the nozzle outlet gap. Instead of having the shape of a cylinder the sleeve can be realized also in the form of a tube with a conical profile viewed in the longitudinal section, whereby the angle of the cone, however, amounts to only a few degrees, so that a longitudinal profile is present to that extent that is approximated to the shape of a cylinder (FIG. 10a). Preferably at both ends, the cylindrical or slightly conical sleeve may have a ring-shaped collar on the outer side (FIGS. 10h, 10i), or a plurality of projections arranged along the periphery and serving as sliding surfaces. Ring-shaped collars on the sleeve generally can be replaced by a plurality of projections arranged on the periphery.

Figure 2:
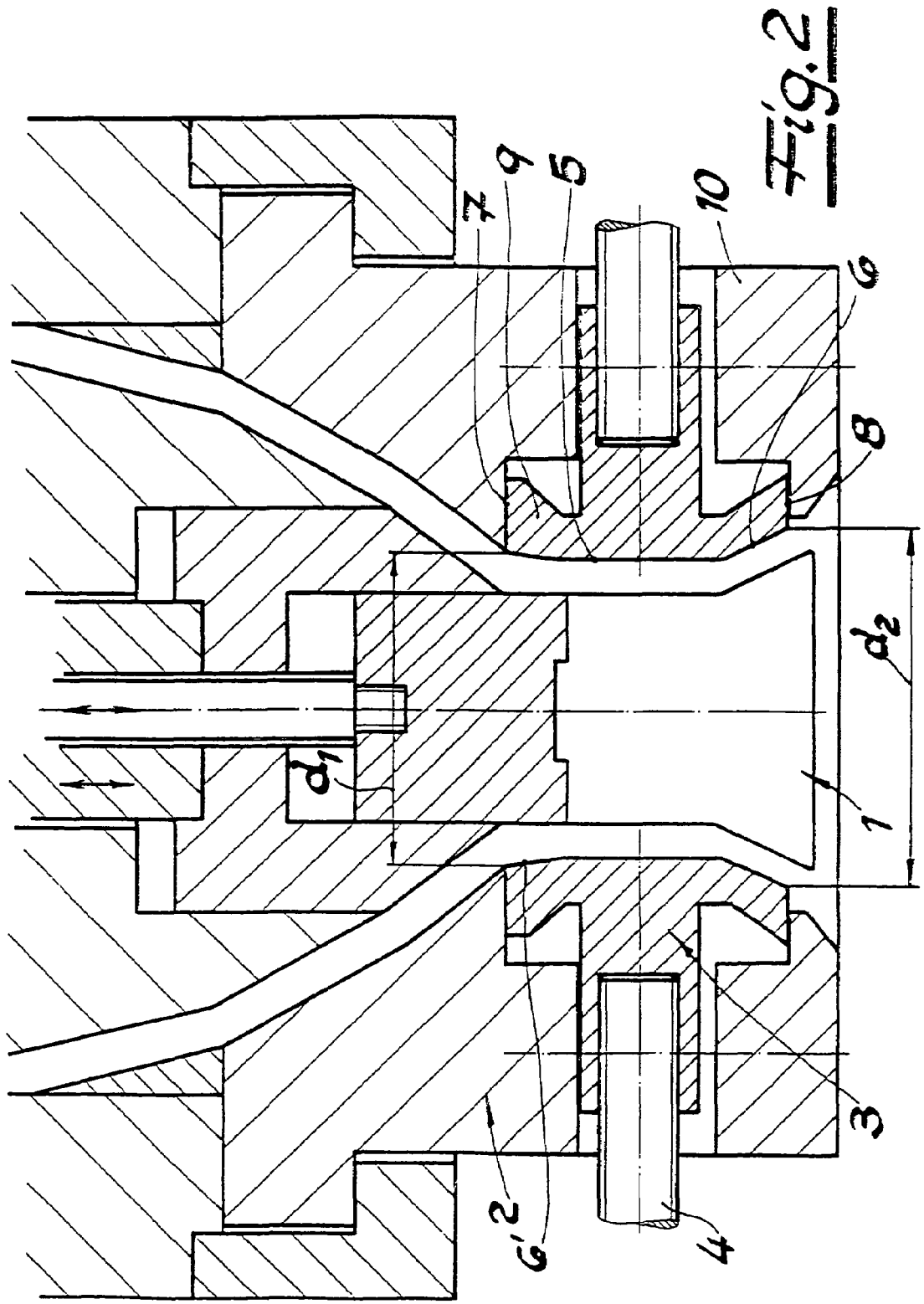
FIG. 2 shows another embodiment of the extruder head by a longitudinal section as well.

In the exemplified embodiment shown in FIG. 2, as well as in the other embodiments according to FIGS. 4 to 8, the sleeve, which is arranged in the body of the nozzle in said embodiments as well, has a conical widening toward the end on the nozzle outlet side, and the inside diameter $d_1$ of the sleeve 3 measured on the upper face is smaller than the inside diameter $d_2$ of the sleeve at the nozzle outlet.

The inside diameter $d_1$ of the sleeve at the upper end on the inlet side, the wall profile of the sleeve and the height $Z_6$ of the point of force application of the setting devices 4 are coordinated with each other in such a way that the upper face of the sleeve 3 guided on a sliding surface 7 of the nozzle body 2 at least maintains its plane parallelism in relation to the sliding surface 7 when the sleeve 3 is deformed. The points of force application by the setting devices 4 are arranged on the periphery of the sleeve 3 in one cross-sectional plane. The suitable cross-sectional plane Zs, in which no distortions occur on the upper face side in the presence of a radial deformation, can be fixed with the help of orienting tests. Said determination is made in such a way that distortions of maximally 60 μm, preferably 30 μm occur in the axial direction in the upper face of the sleeve 3 with maximal deformation of the latter. Distortions are in the present context wave-like elevations and troughs on the upper edge of the sleeve 3. The measure relates to the difference between the peaks and troughs of such waves.

Figure 3:
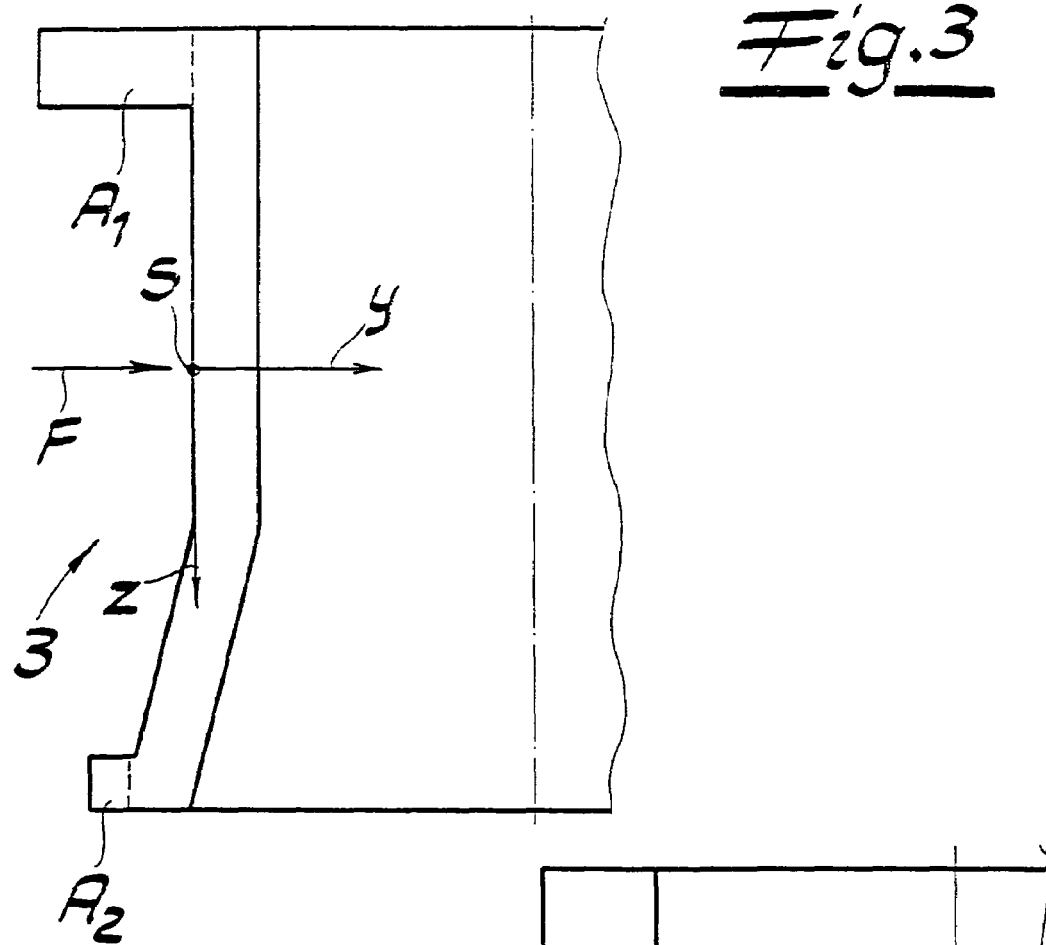
FIG. 3 shows a diagram for fixing the point of force application for the setting drives on an elastically deformable sleeve with an unsymmetrical profile of the sleeve.

FIG. 3 shows a mathematical fixation of the points of force application that comes at least close to the optimum. The cross-sectional plane in which the center of gravity of the area of the wall profile is disposed is selected for the points of force application of the setting devices 4. The coordinates $Y_a$, $Z_s$ of the center of gravity of the area are computed according to the following formula:

$$y_s = \frac{1}{A} \int_A y \, dA$$

$$z_s = \frac{1}{A} \int_A z \, dA$$

A: Area of the wall profile in the longitudinal section

The sleeve has a collar on the outer side at each of its ends, such collars serving as sliding surfaces. Said collar is designed in such a way that the moment of area deviation Iyz determined for the wall profile is negligibly small in the center of gravity S of the area. The moment of area deviation $$I_{yz} = -\int_A yz \, dA$$

is a moment of the second order of an area whose value depends on the shape of the area and its position in the system of coordinates.

Figure 4:
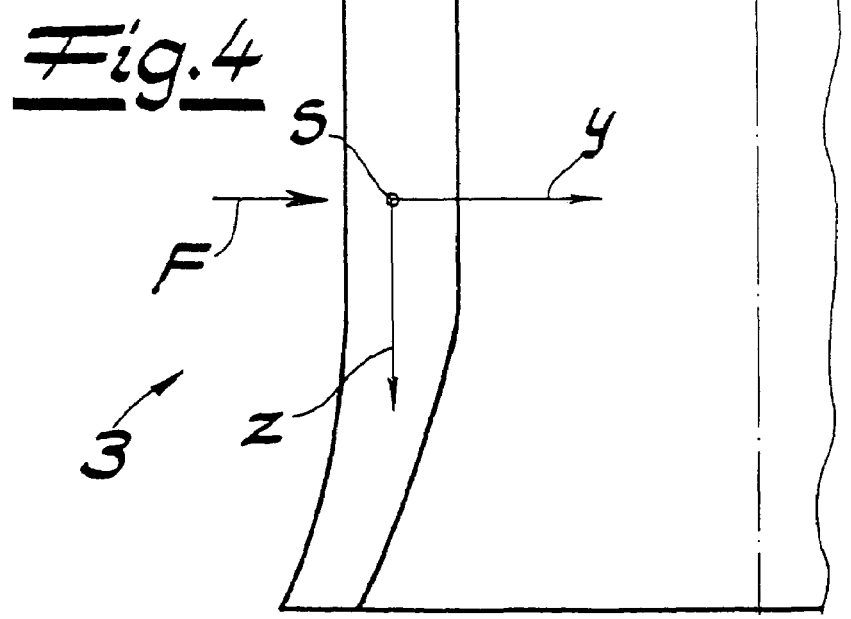
FIG. 4 shows the fixation of the points of force application for the setting drives on another, also unsymmetrical sleeve profile.

Viewed by the longitudinal section, the sleeve shown in FIG. 4 has a wall profile whose moment of area deviation determined in the center of gravity of the area substantially deviates from zero. For compensating the moment of area deviation, the points of force application by the setting devices 4 are arranged offset versus the cross-sectional plane in which the area center of gravity S is disposed. The spacing can be fixed by computation or with the help of a few orienting tests. The point of force application is shifted in the direction of the end of the sleeve having the smaller diameter.

FIGS. 3 and 4 show that in connection with an unsymmetrical embodiment of the sleeve, the points of force application by the setting devices are arranged in most cases not at the level of half of the height of the sleeve, which means they are arranged off-center in the longitudinal direction of the sleeve.

In the embodiment shown in FIG. 2, the sleeve 3 arranged in the nozzle body 2 has a cylindrical center section 5 as well as the conical widenings 6, 6' at both ends, whereby the conical widening 6 towards the nozzle outlet is greater than the widening 6' at the top end on the inlet side. The inside diameter $d_1$ of the sleeve at the top end on the inlet side is usefully adapted to the inside diameter $d_2$ of the sleeve at the nozzle outlet depending on the pressure profile developing in the melt channel in the direction of flow, specifically in such a way that the downwardly acting axial force exerted by the pressure of the melt on the sleeve 3 in the inlet zone can be largely compensated; however, compensated at least by 50% by the lower pressure of the melt prevailing at the nozzle outlet, said lower pressure exerting an upwardly directed force on the sleeve 3.

In the embodiment shown in FIG. 2, the sleeve 3 radially movably abuts the sliding surfaces 7, 8 with its upper and lower faces. Other constructional possibilities, which are shown in FIGS. 5 to 8, are available for supporting the sleeve 3 on the underside. In the embodiments shown in said figures, the sleeve 3 is arranged on the outlet of the ring-gap nozzle without being supported on the lower face side. It has a support surface that is arranged with a spacing from the lower end of the sleeve on the periphery of the sleeve 3, and which is radially movably disposed on the nozzle body 2 or on a holding ring 10 that is rigidly connected with the nozzle body 2.

Figure 5:
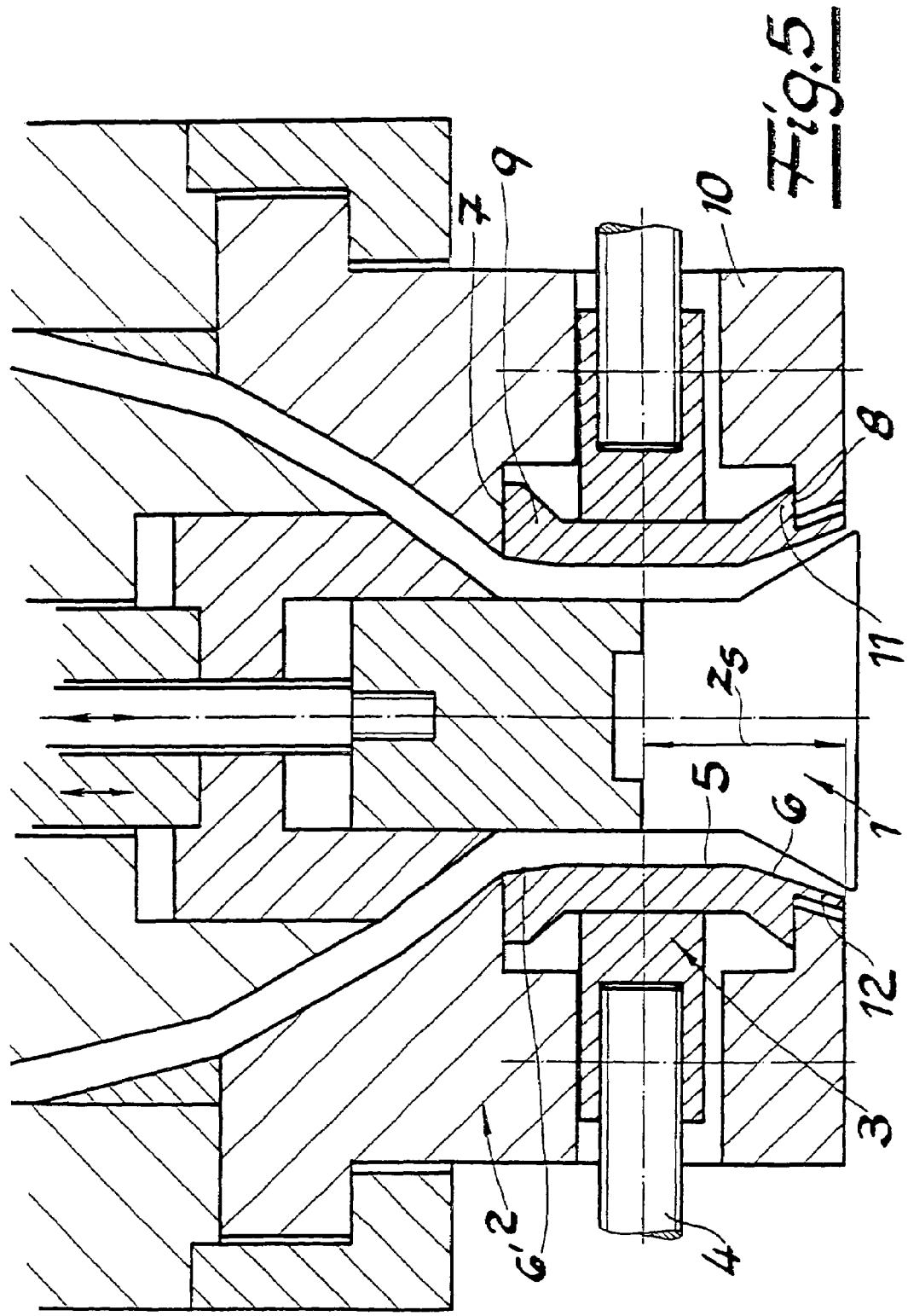

In the exemplified embodiment shown in FIG. 5, the sleeve 3 has a support collar 11 located below the cross-sectional plane in which the setting devices are arranged. A thin-walled apron 12 limiting the melt channel is formed by molding on below the support collar 11.

Figure 6:
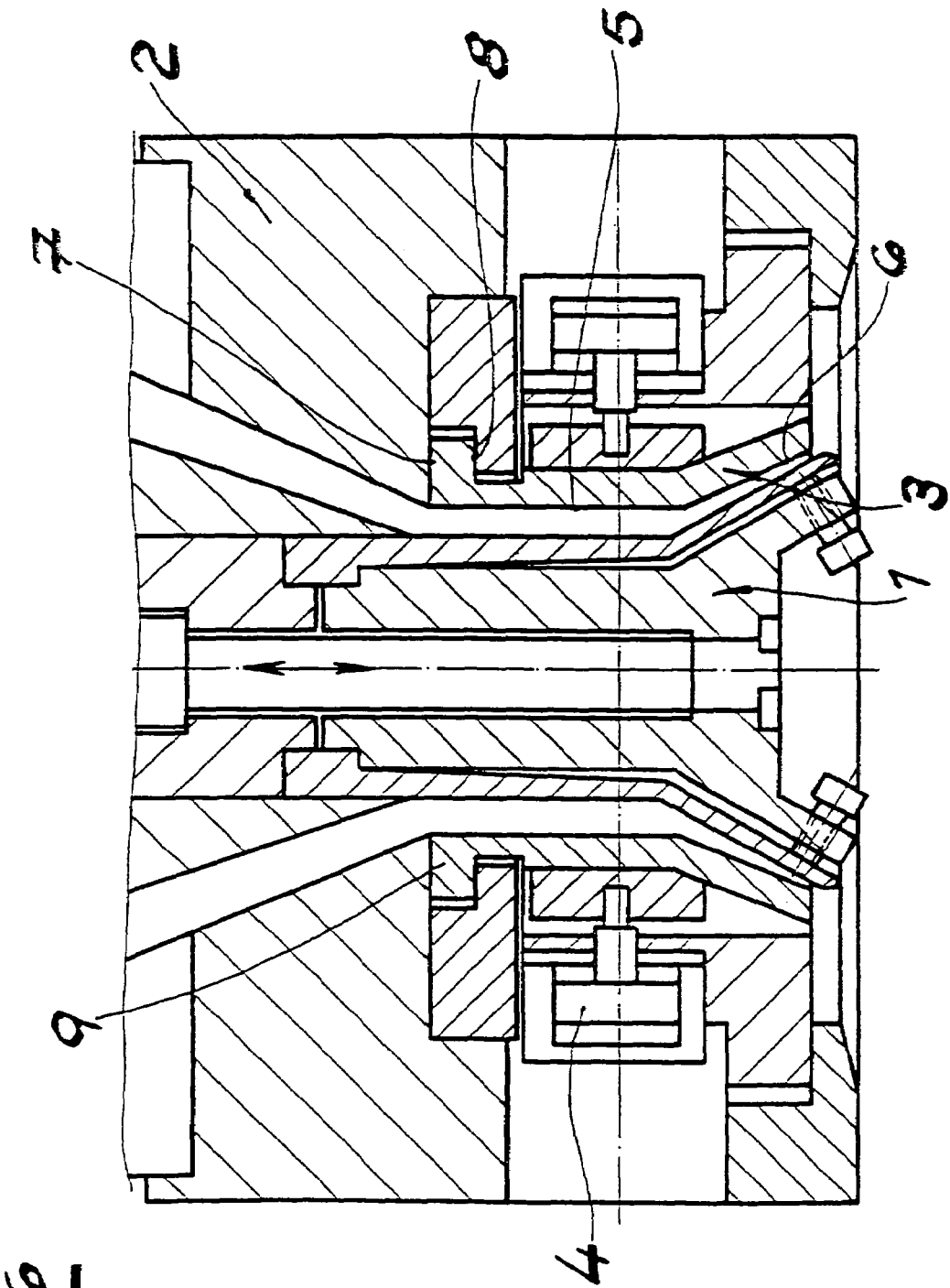

In the exemplified embodiment according to FIG. 6, the sleeve 3 has a collar 9 located at its top end, said collar being radially movably supported between the sliding surfaces 7 and 8.

In the embodiments shown in FIGS. 7 and 8, the sleeve 3 is equipped with the cams 13 on the periphery. Said cams are radially movably disposed on a holding ring 10 and coupled to the setting devices 4. Beneath the cams, the sleeve 3 may have an undercut forming a ring-shaped support surface adjoining the underside of the cams 13 without any step. Furthermore, in peripheral sections between the cams 13 the sleeve 3 may have a ring-shaped undercut that is engaged with radial play by ring segments forming the holding ring 10 in order to support the sleeve 3 (FIG. 8).

Figure 9:
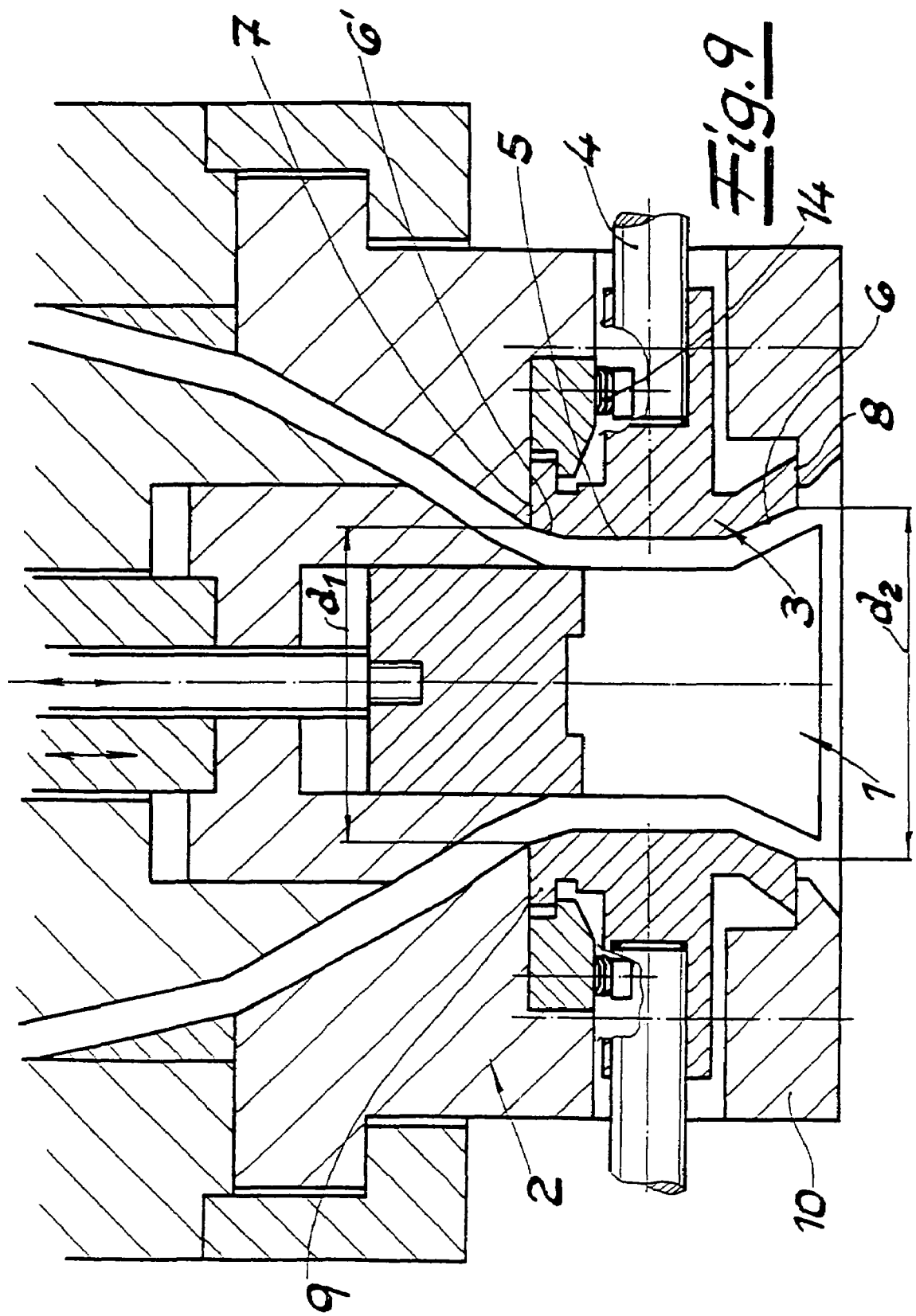

In the exemplified embodiment according to FIG. 9, provision is made for a device for additionally compensating force on the outer jacket side of the elastically deformable sleeve 3, the latter being arranged in the nozzle body 2. On its outer jacket side, the sleeve 3 is equipped with the springs 14 which compensate an axial force exerted on the sleeve 3 by the pressure of the melt.

FIGS. 10b to 10g show further exemplified embodiments of the elastically deformable sleeve that can be employed within the framework of the instruction as defined by the invention. In each embodiment, the sleeve has a conical widening on the side of the nozzle outlet. According to FIG. 10b, the inlet zone of the sleeve is realized in the form of a cylinder. In the exemplified embodiment shown in FIG. 10c, the inlet zone consists of a tube with a longitudinal profile approximated to the shape of the cylinder. The tube is designed with a slightly conical widening that extends from the top face edge of the sleeve to the conical widening.

Figure 10D:
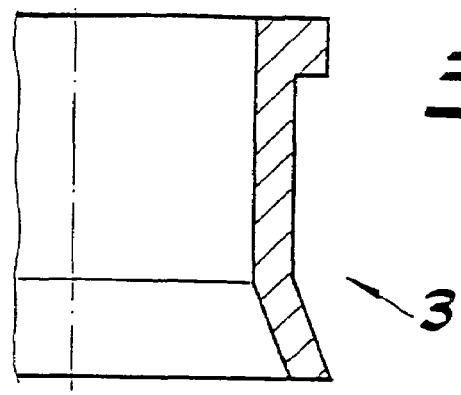
Figure 10E:
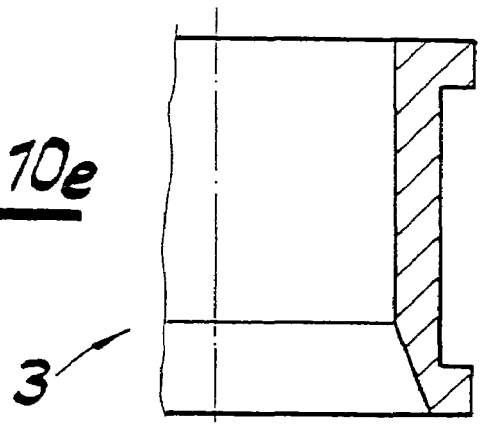

The exemplified embodiment in FIG. 10d shows that at its end on the inlet side, the sleeve is realized with a collar whose outside diameter is larger than the substantially cylindrical jacket section adjoining it on the underside. In addition, a collar may be molded onto the sleeve at the end on the nozzle outlet side as well (FIG. 10e).

Figure 10F:
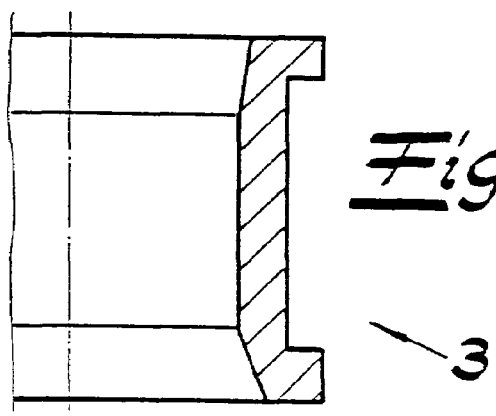
Figure 10G:
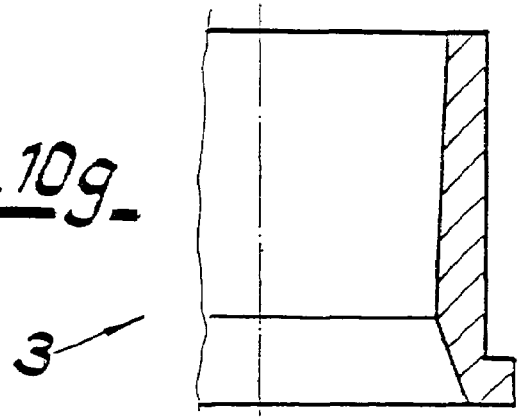
Figure 10H:
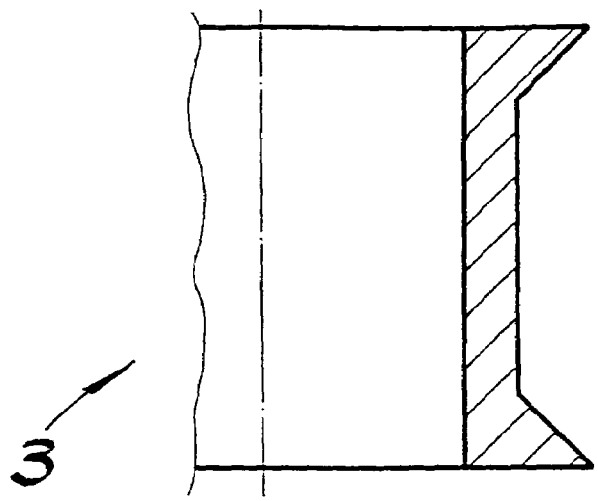
Figure 10I:
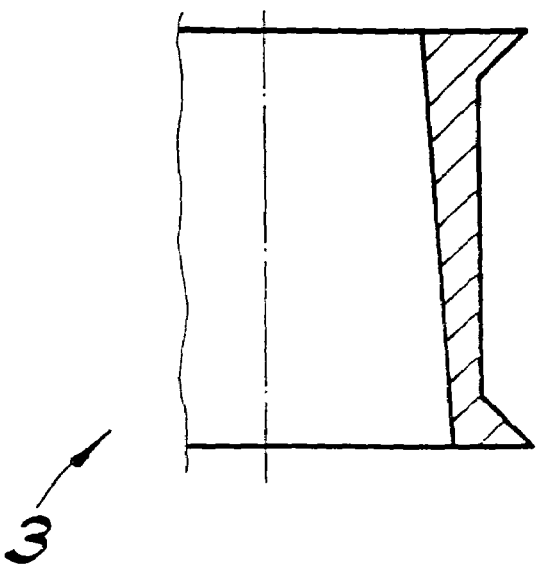
Figure 11:
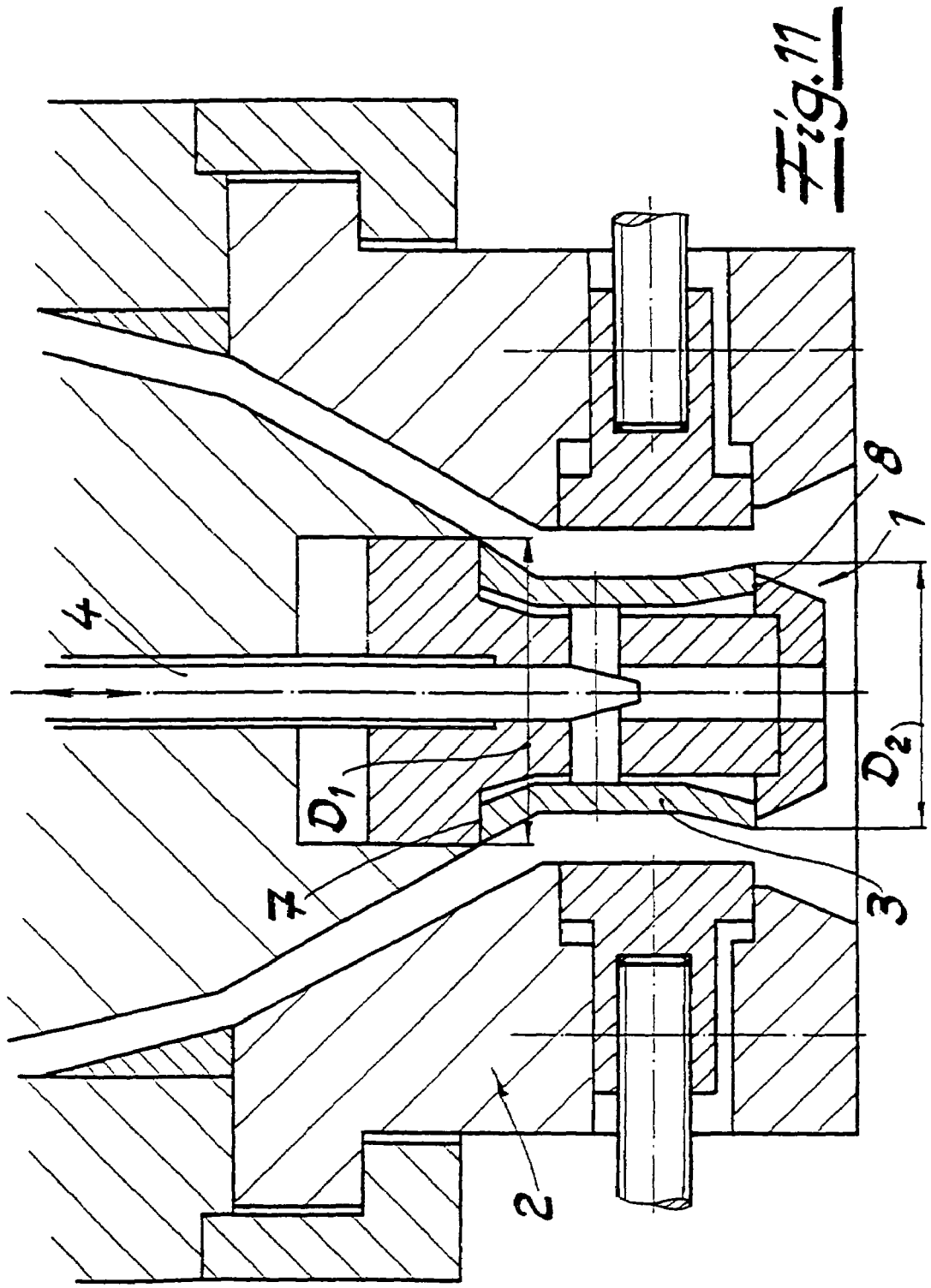

In the exemplified embodiments shown in FIGS. 10f and 10g, the sleeve has conical widenings at both ends, whereby the conical widening on the nozzle outlet is always larger than the widening at the top end on the inlet side. As shown in FIG. 10f, the sleeve may have a cylindrical center section between the conical widenings. It is also within the scope of the invention that the conical widening on the inlet side extends up to the conical widening on the nozzle outlet side (FIG. 10g).

Figure 12:
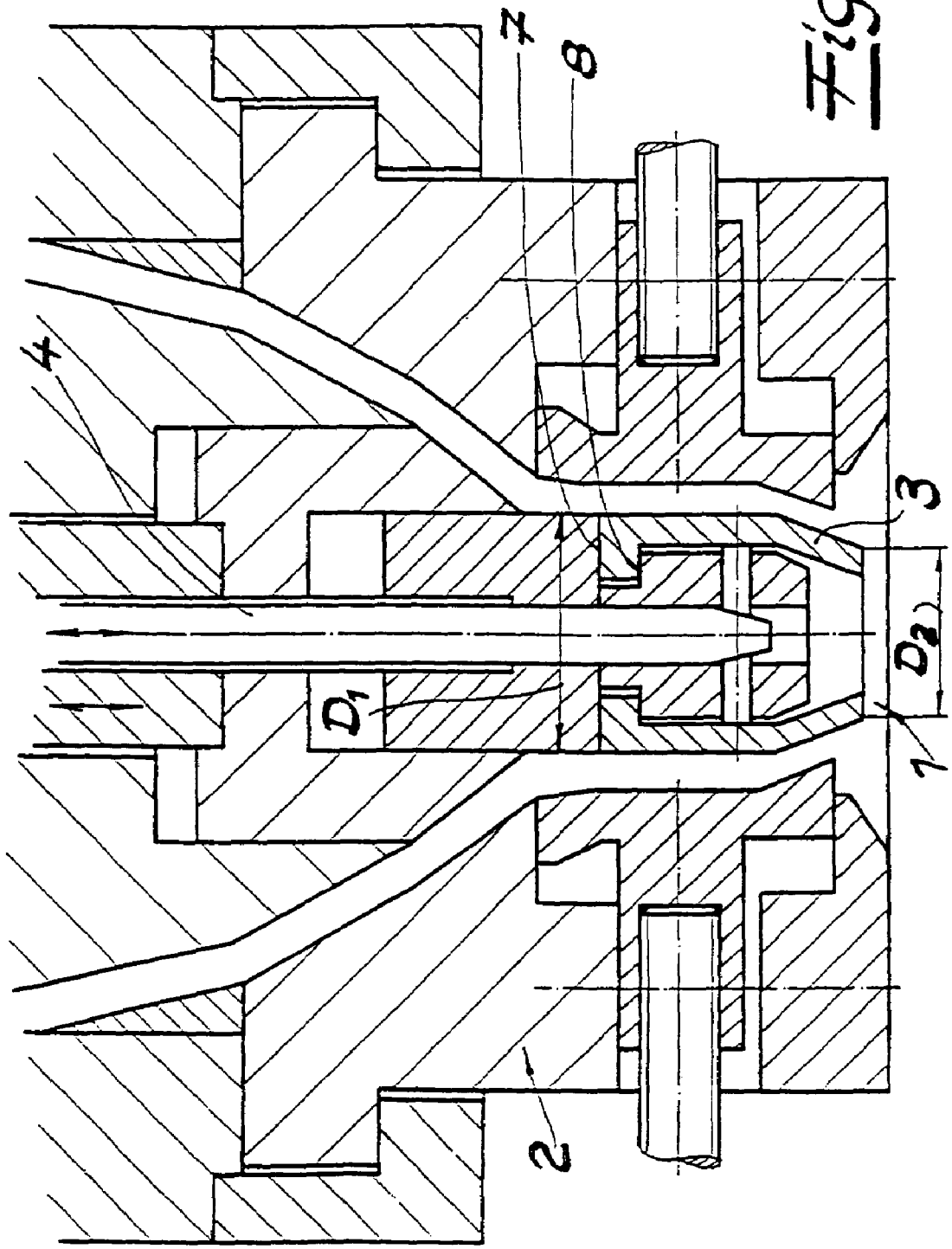

FIGS. 11 to 14 show exemplified embodiments in which the sleeve 3 arranged on the mandrel 1 is realized according to the invention in such a way that largely wear-free deformations and displacements of the sleeve 3 are possible. The sleeve 3, which is arranged on the mandrel 1, has a conical widening towards the upper end on the inlet side (FIG. 11), or it is realized with a taper towards the end on the nozzle outlet side (FIG. 12). The outside diameter $D_1$ of the sleeve measured on the upper face is in this connection always larger than the outside diameter $D_2$ of the sleeve on the nozzle outlet side.

Figure 13:
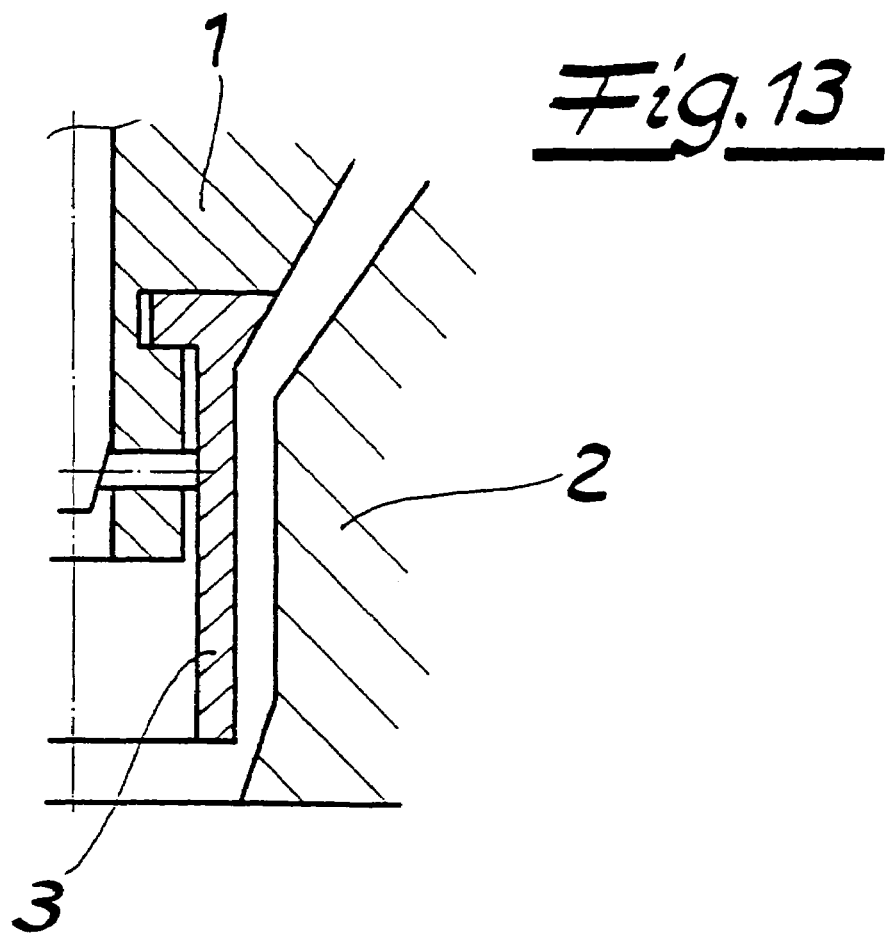

In the embodiment shown in FIG. 13, the sleeve 3 arranged on the mandrel 1 has a cylindrical shape and a conically expanding collar only at the upper end on the inlet side. The molding pressure acting on the conical surface transmits to the sleeve 3 an upwardly directed compensating force that relieves the narrow annular surface supporting the ring on the underside.

Figure 14:
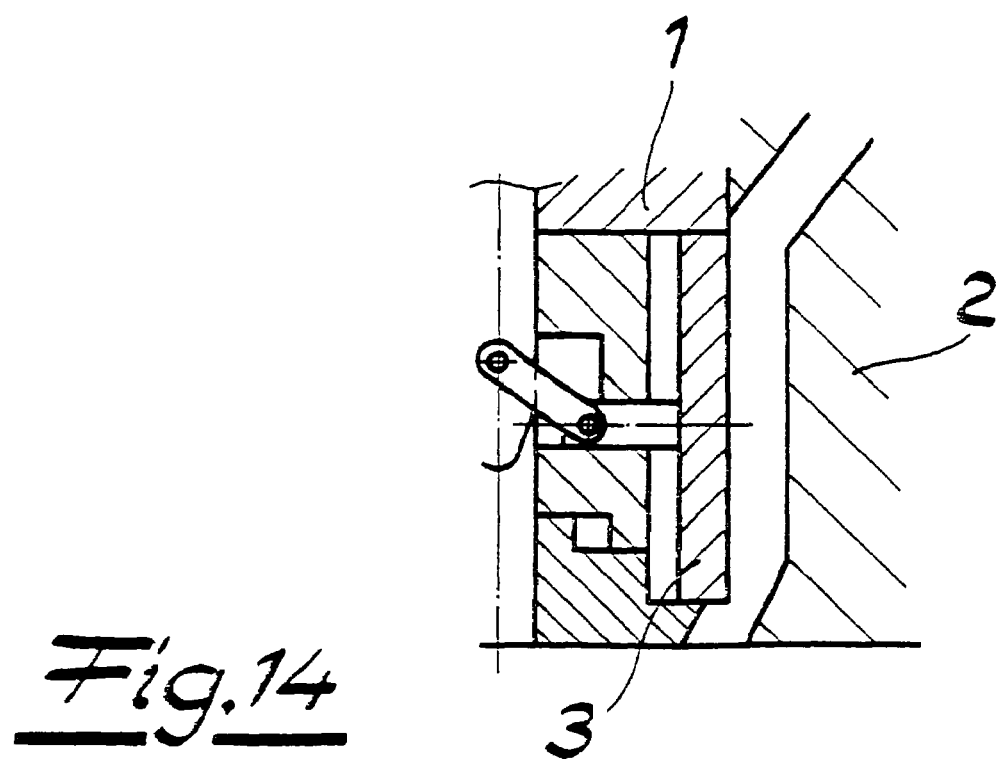

The adjustment of the sleeve 3 can be accomplished with pressure tappets, whereby the sleeve rebounds on account of its elasticity when the pressure tappets are moved back. FIG. 14 shows that provision can be made also for an articulated connection between the setting means and the sleeve 3.

Figure 15:
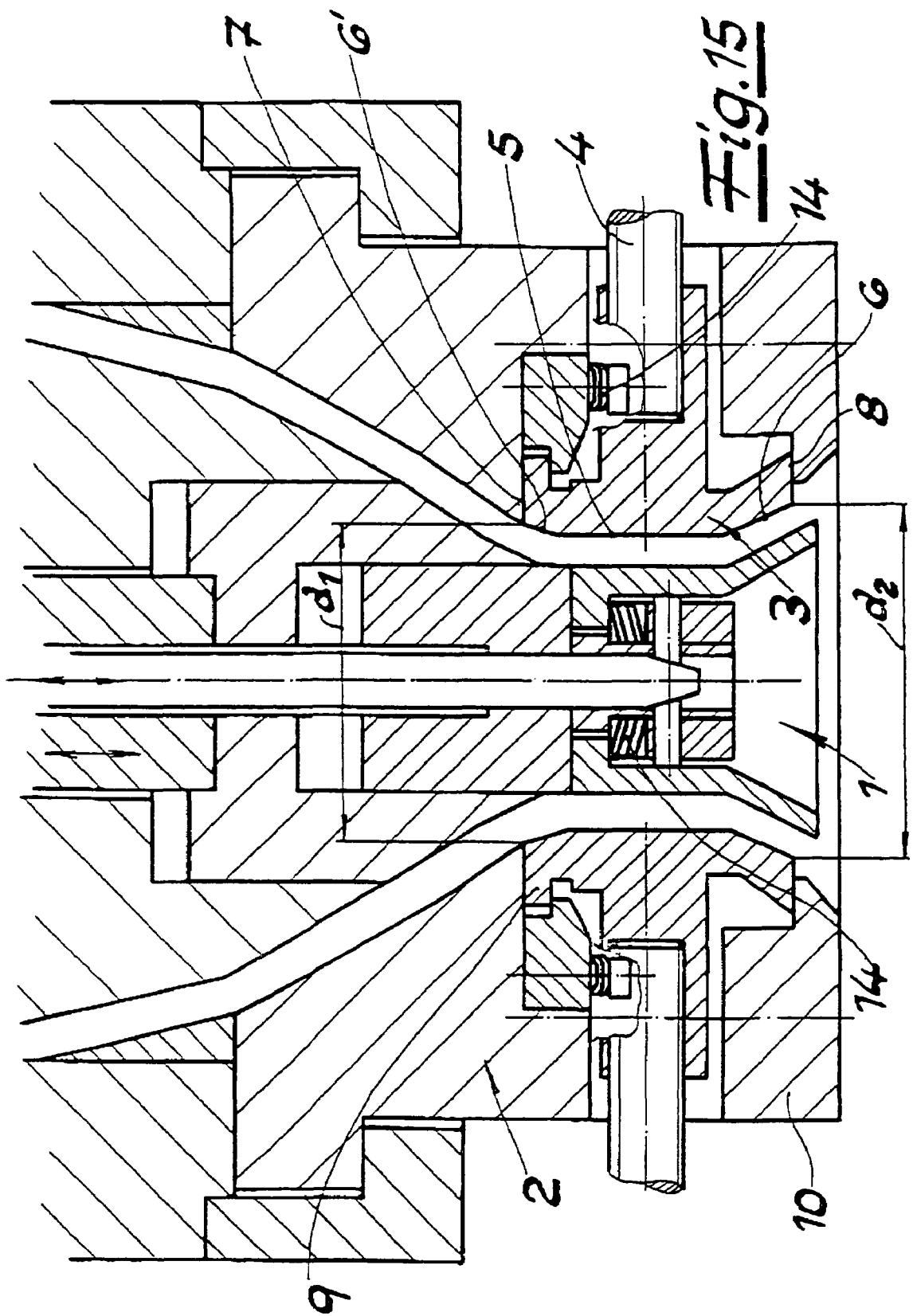

In the exemplified embodiment shown in FIG. 15, an elastically deformable sleeve 3 is arranged both in the nozzle body 2 and on the mandrel 1. The sleeve arranged in the nozzle body 22 has a profile as defined by the invention. Axial forces that are exerted on the sleeve by the build-up of pressure in the melt channel as well as by the resistance to flow are partially compensated by said profile. For further force compensation, the sleeve is supported in the axial direction by the springs 14. The sleeve arranged on the mandrel 1 has a profile corresponding with the state of the art. Substantial forces are exerted on the sleeve arranged on the mandrel 1 by the pressure differences prevailing in the melt channel and by the resistance to flow. Said forces are compensated by the springs 14, which support the sleeve arranged on the mandrel 1 in the axial direction.

All exemplified embodiments described above can be combined with each other in any desired way.

EXAMPLES (1) The sleeve shown in FIG. 3 has the following values:

| | |
|---|---|
| Length: | 60.0 mm |
| Wall thickness of sleeve: | 5.0 mm |
| Cross-sectional area A1 of upper collar: | 70.7 mm$^2$ |
| Cross-sectional area A2 of lower collar: | 12.0 mm$^2$ |
| Spacing of point of force application measured on lower edge of sleeve: | 34.2 mm |
| Moment of area deviation $I_{yz}$: | −13.7 mm$^4$ |
| Moment of area inertia $I_y$: | 161,405.7 mm$^4$ |
| Moment of area inertia $I_z$: | 5,993.1 mm$^4$ |

(2) The sleeve shown in FIG. 4 has a length of 60.0 mm and a wall thickness of 9.0 mm in the cylindrical section. The following values are obtained for the moment of area deviation and the moments of inertia:

| | |
|---|---|
| Moment of area deviation $I_{yz}$: | −10,408.9 mm$^4$ |
| Moment of area inertia $I_y$: | 138,497.1 mm$^4$ |
| Moment of area inertia $I_z$: | 4,196.8 mm$^4$ |

The point of force application by the setting devices lies above the cross-sectional plane in which the center of gravity of the area is located.

The invention claimed is:

1. An extruder head for extrusion blow-molding plastic containers, with
   a ring gap nozzle having a mandrel (1) and a ring-shaped nozzle body (2);
   an elastically deformable sleeve (3); and
   setting devices (4) for radially deforming the elastic sleeve (3);
   whereby the sleeve (3) arranged at the end on the nozzle outlet side defines a nozzle gap whose width is variable by axial setting movements of the mandrel (1) and/or the nozzle body (2), and whose geometry can be influenced by deforming the sleeve (3) while a hose-shaped preformed blank is being extruded, and whereby the sleeve (3) is radially movably guided on sliding surfaces (7, 8) supporting the sleeve (3) in the upward and downward directions; characterized in that the sleeve (3) is realized from the upper end on the inlet side to the outlet of the nozzle in the form of a cylinder having an inner surface of constant diameter, whereby the lower edge (15) of the sleeve (3) on the inside of the cylinder shapes the exiting cross-section of the stream of melt exiting from the ring-gap nozzle.

2. The extruder head according to claim 1, wherein at least at one end, the sleeve (3) has a ring-shaped collar on the outer side, said collar comprising a circumferential bead and serving as a sliding surface, wherein the sleeve has a greater wall thickness in a region of the collar than in a section away from the collar.

3. The extruder head according to claim 1, wherein at least at one end, the sleeve (3) has a plurality of projections arranged on the outer periphery, said projections serving as the sliding surfaces.

4. The extruder head according to claim 2, wherein the sleeve (3) radially movably abuts sliding surfaces (7,8) of the nozzle body (2) with its upper and lower faces.

5. The extruder head according to claim 3, wherein the sleeve (3) radially movably abuts sliding surfaces (7,8) of the nozzle body (2) with its upper and lower faces.

6. The extruder head according to claim 1, wherein the sleeve (3) is arranged without lower support on the face side on the outlet of the ring gap nozzle and has a supporting surface for the radially movable support, said supporting surface being arranged on the periphery of the sleeve (3) with a spacing from the lower end of the sleeve.

7. The extruder head according to claim 5, wherein the sleeve (3) has a collar (9) at its upper end, said collar being radially movably held between sliding surfaces (7,8).

8. An extruder head for extrusion blow-molding plastic containers, with
   a ring gap nozzle having a mandrel (1) and a ring-shaped nozzle body (2);
   an elastically deformable sleeve (3); and
   setting devices (4) for radially deforming the elastic sleeve (3);
   whereby the sleeve (3) arranged at the end on the nozzle outlet side defines a nozzle gap whose width is variable by axial setting movements of the mandrel (1) and/or nozzle body (2), and whose geometry can be influenced by deforming the sleeve (3) while a hose-shaped preformed blank is being extruded, and whereby the sleeve (3) is radially movable on sliding surfaces (7, 8) supporting the sleeve (3) in the upward and downward directions; wherein the sleeve (3) is realized from the upper end on the inlet side to the outlet of the nozzle in the form of a tube with a cone that is slightly directed inwards or outwards, whereby the conical angle amounts to only a few degrees in this connection so that the longitudinal profile of the tube is approximated to the shape of the cylinder, whereby the lower edge (15) of the sleeve (3) on the inside of the tube shapes the exiting cross-section of the stream of melt exiting from the ring-gap nozzle, and wherein at least at one end, the sleeve (3) has a ring-shaped collar on the outer side, said collar comprising a circumferential bead and serving as a sliding surface, wherein the sleeve has a greater wall thickness in a region of the collar than in a section away from the collar.

9. The extruder head according to claim 8, wherein at least at one end, the sleeve (3) has a plurality of projections arranged on the outer periphery, said projections serving as the sliding surfaces.

10. The extruder head according to claim 8, wherein the sleeve (3) radially movably abuts sliding surfaces (7,8) of the nozzle body (2) with its upper and lower faces.

11. The extruder head according to claim 9, wherein the sleeve (3) radially movably abuts sliding surfaces (7,8) of the nozzle body (2) with its upper and lower faces.

12. The extruder head according to claim 8, wherein the sleeve (3) is arranged without lower support on the face side on the outlet of the ring gap nozzle and has a supporting surface for the radially movable support, said supporting surface being arranged on the periphery of the sleeve (3) with a spacing from the lower end of the sleeve.

13. The extruder head according to claim 12, wherein the sleeve (3) has a collar (9) at its upper end, said collar being radially movably held between sliding surfaces (7,8).

* * * * *